(12) United States Patent
Cvek

(10) Patent No.: US 7,518,508 B2
(45) Date of Patent: Apr. 14, 2009

(54) EMERGENCY AND SECURITY CONDITION RETRACTABLE COMPUTER ARRANGEMENTS

(76) Inventor: Sava Cvek, 40 Woodland Rd., Jamaica Plain, MA (US) 02130

( * ) Notice: Subject to any disclaimer, the term of this patent is extended or adjusted under 35 U.S.C. 154(b) by 741 days.

(21) Appl. No.: 11/298,110

(22) Filed: Dec. 8, 2005

(65) Prior Publication Data

US 2006/0161993 A1  Jul. 20, 2006

Related U.S. Application Data

(60) Provisional application No. 60/635,268, filed on Dec. 8, 2004.

(51) Int. Cl.
| G08B 13/08 | (2006.01) |
| G08B 23/00 | (2006.01) |
| A47B 81/00 | (2006.01) |
| A47B 97/00 | (2006.01) |
| G06F 1/16  | (2006.01) |

(52) U.S. Cl. ............... 340/545.6; 340/693.6; 312/223.2; 726/34; 361/680; 361/681; 361/682; 361/683; 361/684; 361/685

(58) Field of Classification Search ................. 340/500, 340/540, 541, 545.1, 546, 545.8, 568.1, 5.74, 340/3.1, 693.5, 693.6, 570, 571, 686.1, 5.52, 340/5.2; 312/223.3, 223.2; 726/34–36; 361/680–686

See application file for complete search history.

(56) References Cited

U.S. PATENT DOCUMENTS

| 2,861,857 | A | 11/1958 | Lee et al. |
| 3,761,152 | A | 9/1973 | Cory |
| 3,925,918 | A | 12/1975 | Pelin |
| 4,065,194 | A | 12/1977 | Mattia |
| 4,690,466 | A | 9/1987 | Bakr et al. |
| 4,735,467 | A | 4/1988 | Wolters |
| 4,766,422 | A | 8/1988 | Wolters et al. |
| 4,828,342 | A | 5/1989 | Stefan |
| 5,101,736 | A | 4/1992 | Bommarito et al. |
| 5,173,686 | A | 12/1992 | Fujihara |
| 5,273,352 | A | 12/1993 | Saper |
| 5,321,579 | A | 6/1994 | Brown et al. |
| 5,401,089 | A | 3/1995 | Inagaki et al. |
| 5,437,235 | A | 8/1995 | Randolph |
| 5,526,756 | A | 6/1996 | Watson |
| 5,666,265 | A * | 9/1997 | Lutz et al. ............... 361/683 |

(Continued)

OTHER PUBLICATIONS

Wood Technology, Inc., webpage screen shots, Jan. 17-18, 2006, 7 pgs, Wood Technology, Inc., Pittsboro, NC USA.

*Primary Examiner*—Toan N Pham
*Assistant Examiner*—Jennifer Mehmood
(74) *Attorney, Agent, or Firm*—O'Connell Law Firm

(57) ABSTRACT

A computer arrangement for inducing a retraction of a computer component in response to a sensed emergency or security condition. The computer arrangement can include an enclosure with an open inner volume and a support member extendably and retractably retained relative to the enclosure. A computer component, such as a monitor, a keyboard, or a laptop computer, can be retained relative to the support member. One or more sensors can sense an emergency or security condition thereby to induce a retraction of the support member and, possibly, a closing of a lid. The keyboard or laptop computer can be retained relative to a support unit or cradle, which can be manually or automatically pivotable between a storage configuration and a second configuration.

26 Claims, 16 Drawing Sheets

U.S. PATENT DOCUMENTS

| | | | |
|---|---|---|---|
| 5,732,919 A | 3/1998 | Rosen et al. | |
| 5,797,666 A | 8/1998 | Park | |
| 5,815,571 A * | 9/1998 | Finley | 713/189 |
| 5,845,587 A | 12/1998 | Ditonto | |
| 5,847,685 A | 12/1998 | Otsuki | |
| 6,012,788 A | 1/2000 | Marschand et al. | |
| 6,062,148 A | 5/2000 | Hodge et al. | |
| 6,102,355 A | 8/2000 | Rood | |
| 6,128,186 A * | 10/2000 | Feierbach | 361/683 |
| 6,352,226 B1 | 3/2002 | Gordon | |
| 6,381,128 B1 | 4/2002 | Kramer | |
| 6,414,842 B1 * | 7/2002 | Cipolla et al. | 361/687 |
| 6,463,862 B1 | 10/2002 | Kuhlman et al. | |
| 6,469,626 B1 * | 10/2002 | Hung | 340/568.2 |
| 6,494,150 B1 | 12/2002 | Phoenix et al. | |
| 6,553,919 B1 | 4/2003 | Nevin | |
| 6,609,465 B2 | 8/2003 | Kolavo | |
| 6,612,670 B2 | 9/2003 | Liu | |
| 6,626,686 B1 | 9/2003 | D'Souza et al. | |
| 6,733,094 B1 | 5/2004 | Chang | |
| 6,754,070 B2 | 6/2004 | Chen | |
| 6,783,105 B2 | 8/2004 | Oddsen, Jr. | |
| 6,832,822 B2 | 12/2004 | Canedy et al. | |
| 6,883,759 B2 | 4/2005 | Park et al. | |
| 6,902,243 B2 | 6/2005 | Bober | |
| 6,913,332 B1 | 7/2005 | Besterfield et al. | |
| 7,029,079 B2 | 4/2006 | Holt | |
| 7,044,423 B2 | 5/2006 | Bober et al. | |
| 7,063,024 B2 | 6/2006 | Latino | |
| 7,128,003 B2 | 10/2006 | Okninski | |
| 7,178,469 B2 | 2/2007 | Goza | |
| RE40,012 E * | 1/2008 | Patterson | 340/571 |
| 2002/0101139 A1 | 8/2002 | Lee | |
| 2004/0070319 A1 | 4/2004 | Miller | |
| 2005/0056734 A1 | 3/2005 | Lee | |
| 2005/0236527 A1 | 10/2005 | Takagi | |
| 2008/0060560 A1 | 3/2008 | Chen | |

* cited by examiner

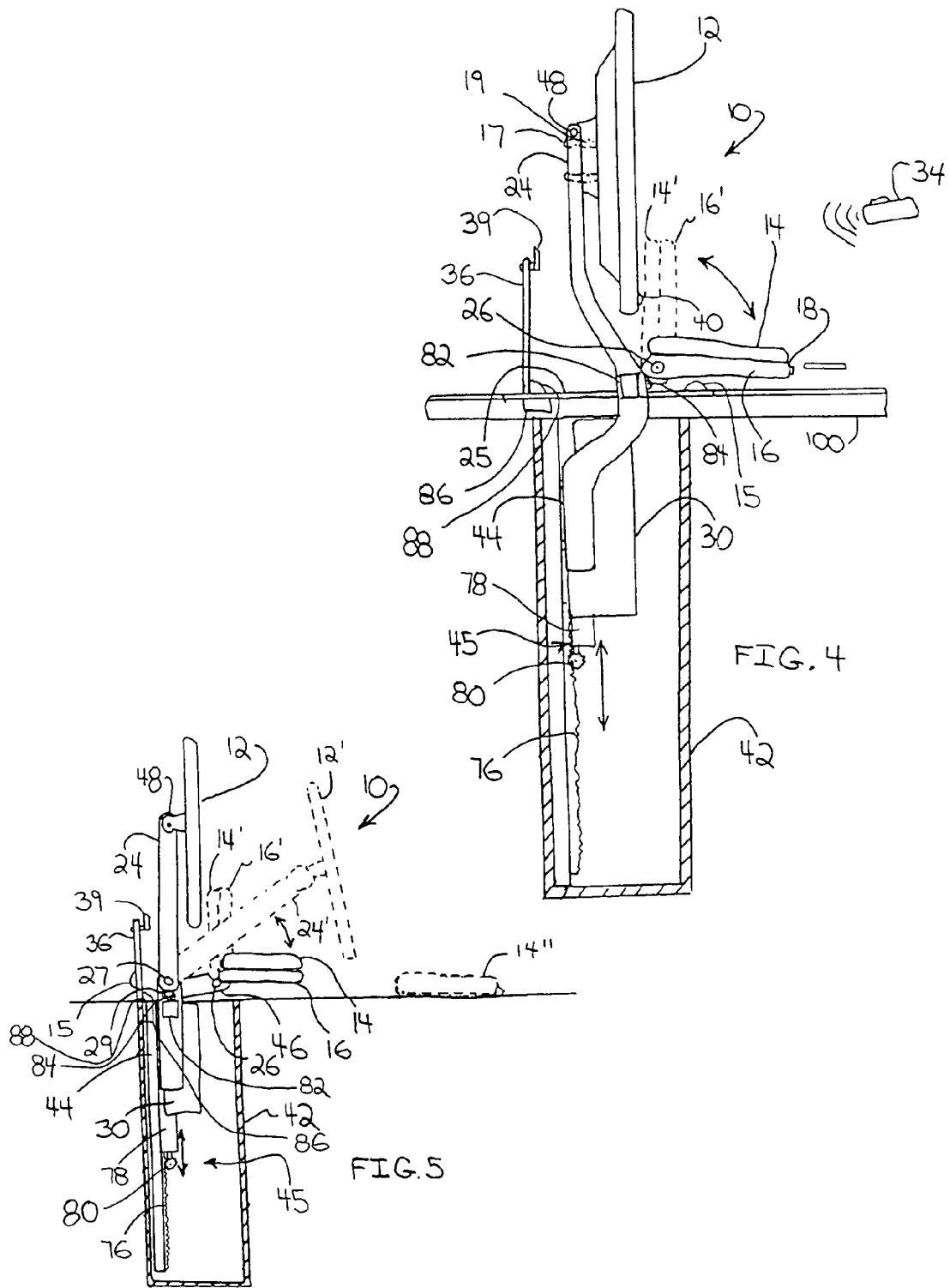

EMERGENCY AND SECURITY CONDITION RETRACTABLE COMPUTER ARRANGEMENTS

FIELD OF THE INVENTION

The present invention relates generally to electronic systems and methods. More particularly, disclosed and protected herein are arrangements and methods for inducing a retraction of computer arrangements in response to sensed emergency and security conditions.

BACKGROUND OF THE INVENTION

In numerous circumstances, it would be advantageous to be able to induce an automatic retraction of a computer arrangement in response to a sensed emergency or security condition. By way of example, computers, computer components, and the data contained therein can be damaged or rendered unusable by fire and other extreme conditions. Furthermore, the mere threat of fire in a building can induce emergency precautions, such as sprinkler and fire retardant activation, that can impart irremediable damage to computer components. Additionally, theft, tampering, and unauthorized access to computer components present real and recognized dangers to businesses and individuals. Indeed, the risk of theft increases in proportion to the consistent decrease in physical size of computer components. Slim screen monitors, laptops, and other computers and computer components have become victim to their portability in that unauthorized persons can steal the devices quickly and surreptitiously.

A number of talented inventors have sought to provide mechanisms for enabling an adjustment of a relative position of an electronic component, such as a computer monitor. For example, in U.S. Pat. No. 5,526,756, Watson discloses a multi-platform desk with cantilevered and threaded rod combinations for adjustably supporting keyboard and monitor platforms at desired heights. Additionally, in U.S. Pat. No. 6,494,150, Phoenix et al. describes a display elevating and lowering mechanism that employs a complex threaded rod arrangement. Still further, U.S. Pat. No. 6,733,094 to Chang is directed to a parallelepiped lifting device for a computer monitor that operates based on a combination of chain wheels, bars, and adjusting screws. To date, however, the prior art has failed to provide satisfactory systems and methods for enabling a retraction of computer components to a protected configuration to prevent damage and loss due to emergency and security threats.

SUMMARY OF THE INVENTION

In light of the state of the art summarized above, the present invention is founded on the basic object of providing arrangements and methods for inducing a retraction of computer arrangements in response to sensed emergency and security conditions. This and further objects and advantages of the present invention will become obvious not only to one who reviews the present specification and drawings but also to those who have an opportunity to experience an embodiment of the systems and arrangements disclosed herein. However, it will be appreciated that, although the accomplishment of multiple objects in a single embodiment of the invention may be possible and indeed preferred, not all embodiments will seek or need to accomplish each and every potential advantage and function. Nonetheless, all such embodiments should be considered within the scope of the present invention.

One embodiment of the present invention essentially comprises a computer arrangement for inducing a retraction of a computer component in response to a sensed emergency or security condition having an enclosure, a support member extendably and retractably retained relative to the enclosure, means for retaining a computer component in relation to the support member, means for selectively inducing a retraction of the support member at least partially into the open inner volume of the enclosure, means for sensing an emergency or security condition, and means for inducing a retraction of the support member in response to a sensed emergency or security condition. Under such an arrangement, a computer component can be retracted at least partially into the enclosure in response to a sensed emergency or security condition.

The means for retaining a computer component can comprise a means for retaining a computer monitor. Additionally or alternatively, the means can comprise a means, such as a support unit, for retaining a computer keyboard. In certain cases, a cradle can removably and replaceably retain laptop computer thereby acting as a means for retaining a computer monitor and a means for retaining a computer keyboard. The support unit can be manually or automatically pivotable between a first, storage disposition and a second disposition. In such embodiments, there can be an automated pivoting of the support unit to the first, storage disposition in response to a sensed emergency or security condition.

Furthermore, a lid can be provided for selectively closing off the open inner volume of the enclosure when the support member is in a retracted disposition. To facilitate a protection of the retained computer component, a means, such as a motorized arrangement, can be provided for enabling an automated closing of the lid in response to a sensed emergency or security condition thereby to close off the open inner volume of the enclosure. The enclosure can provide added protection against fire damage by the inclusion of fire resistant and retardant material. Still further, means, such as gaskets, seals, or the like, can be provided for rendering the open inner volume of the enclosure substantially watertight when the lid is in a closed position thereby to prevent damage during fire emergencies, tampering, and inadvertent spillage.

Access to the computer component can be controlled by a means for selectively preventing and enabling extension of the support member. That means can, for example, comprise an access card, an access key, a fingerprint identification means, or any similarly effective means or combination thereof. In certain constructions, the access control means can further include the lid, which can be locked in a closed configuration by a locking arrangement.

The means for sensing an emergency or security condition can comprise a sensor disposed on the computer arrangement. Alternatively or additionally, the means for sensing an emergency or security condition can comprise a means for receiving emergency or security condition information from an external source, such as a building security system, a main control center, an external authority, or the like. In any case, sensors can include one or more of a motion sensor, a smoke sensor, and an access sensor.

One will appreciate that the foregoing discussion broadly outlines the more important features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

In the accompanying drawing figures:

FIG. 4 is a sectioned view in side elevation of another retractable computer arrangement;

FIG. 5 is a sectioned view in side elevation of yet another retractable computer arrangement;

DETAILED DESCRIPTION OF PREFERRED EMBODIMENTS

The emergency and security condition retractable computer arrangements disclosed herein are subject to widely varied embodiments. However, to ensure that one skilled in the art will be able to understand and, in appropriate cases, practice the present invention, certain preferred embodiments of the broader invention revealed herein are described below and shown in the accompanying drawing figures. Before any particular embodiment of the invention is explained in detail, it must be made clear that the following details of construction and illustrations of inventive concepts are mere examples of the many possible manifestations of the invention.

Figure 1:
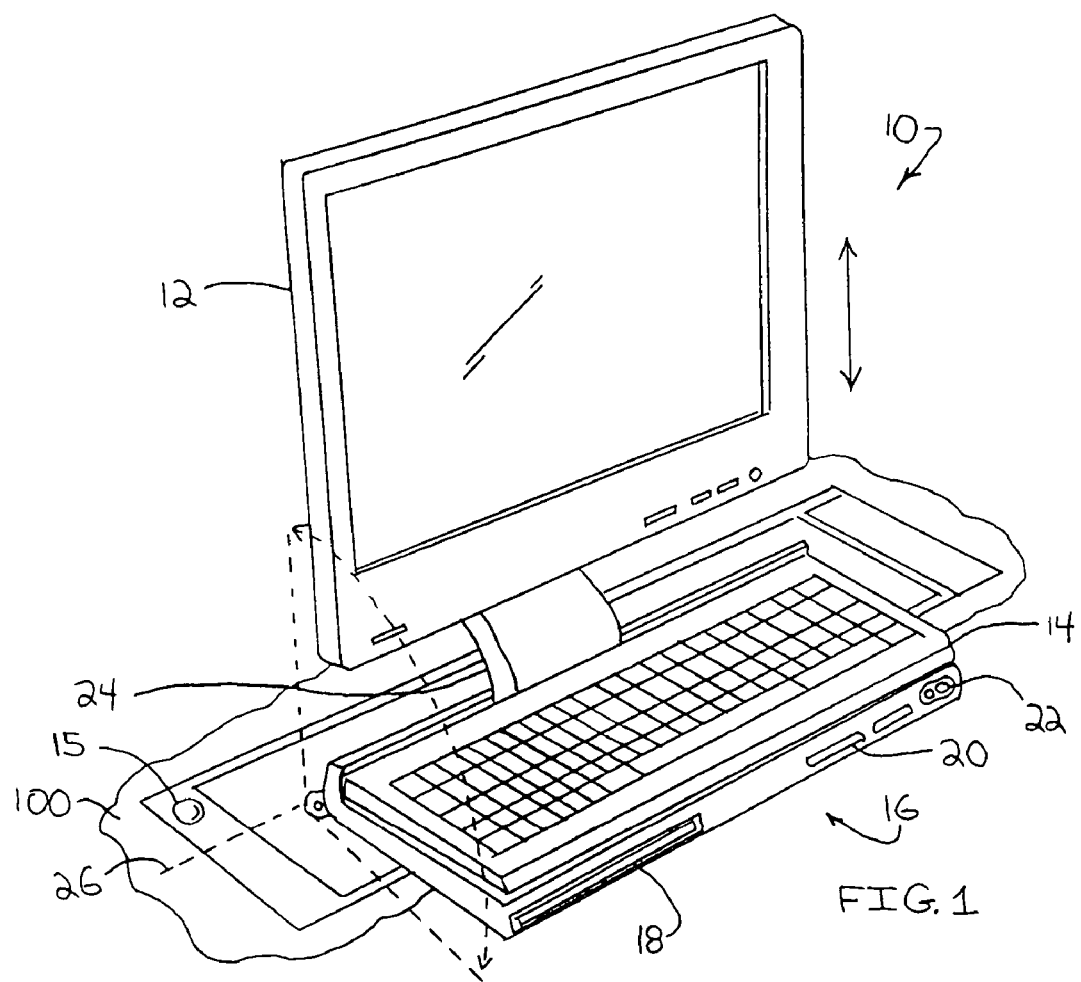
FIG. 1 is a perspective view of an emergency and security condition retractable computer arrangement according to the present invention.

Looking more particularly to the drawings, one example of an emergency and security condition retractable computer arrangement pursuant to the present invention is indicated generally at 10 in FIG. 1. There, the computer arrangement 10 is adjustable between a retracted storage position below a support surface 100 and the illustrated position where the computer arrangement is extended for usage. When the computer arrangement 10 is in a retracted configuration, it can be disposed substantially entirely below the support surface 100 to enable alternative uses thereof.

The specific mechanism for rendering the computer arrangement 10 extendable and retractable can vary within the scope of the invention. As shown and described herein, extension and retraction can be carried out manually by the user, by a motorized arrangement, or by any combination thereof. Likewise, the particular support surface 100 is of little consequence to the invention. In one manifestation of the invention, the support surface 100 can be a desk, table, counter, or other support surface 100. Further details regarding extension and retraction arrangements are disclosed by the present inventor in U.S. patent application Ser. No. 11/152,994, filed Jun. 14, 2005 and entitled Extension and Retraction Arrangements, which is incorporated by reference as if fully set forth herein.

The computer arrangement 10 can have a support arm 24 for retaining an article, which can vary widely within the scope of the invention. In this example, the article comprises a flat panel computer monitor 12. The retained article can alternatively comprise, by way of example and not limitation, an entire computer, such as a laptop; a computer keyboard; or any other computer component. Furthermore, within the present disclosure, reference to a computer component or the like should be interpreted to include all or a portion of a computer system, including a laptop, a keyboard, a monitor, a mouse, and additionally or alternatively, a central processing unit and other components except as otherwise expressly limited.

As is shown in FIG. 4, threaded fasteners 17 can retain the monitor 12 relative to the support arm 24 by use of threaded mounting apertures 19. The threaded fasteners 17 can exploit the threaded mounting apertures 19 that are typically provided in a standard configuration on the rear of most flat screen monitors pursuant to the Video Electronics Standards Association Flat Display Mounting Standard.

In certain embodiments, as in FIG. 1, a keyboard 14 and, possibly, a support unit 16 can be retained to extend and retract with the monitor 12 and the support arm 24. The keyboard 14 and the support unit 16 can be pivotable about a pivot axis 26. With this, the keyboard 14 and the support unit 16 can adjust between an upturned configuration adjacent to the monitor 12 for being retracted therewith and the downturned configuration depicted in FIG. 1 for being used. The keyboard 14 and the support unit 16 can be pivotally coupled to the support arm 24, to a carriage (not shown), or to any other structure that is preferably extendable and retractable with the monitor 12.

Figure 2A:
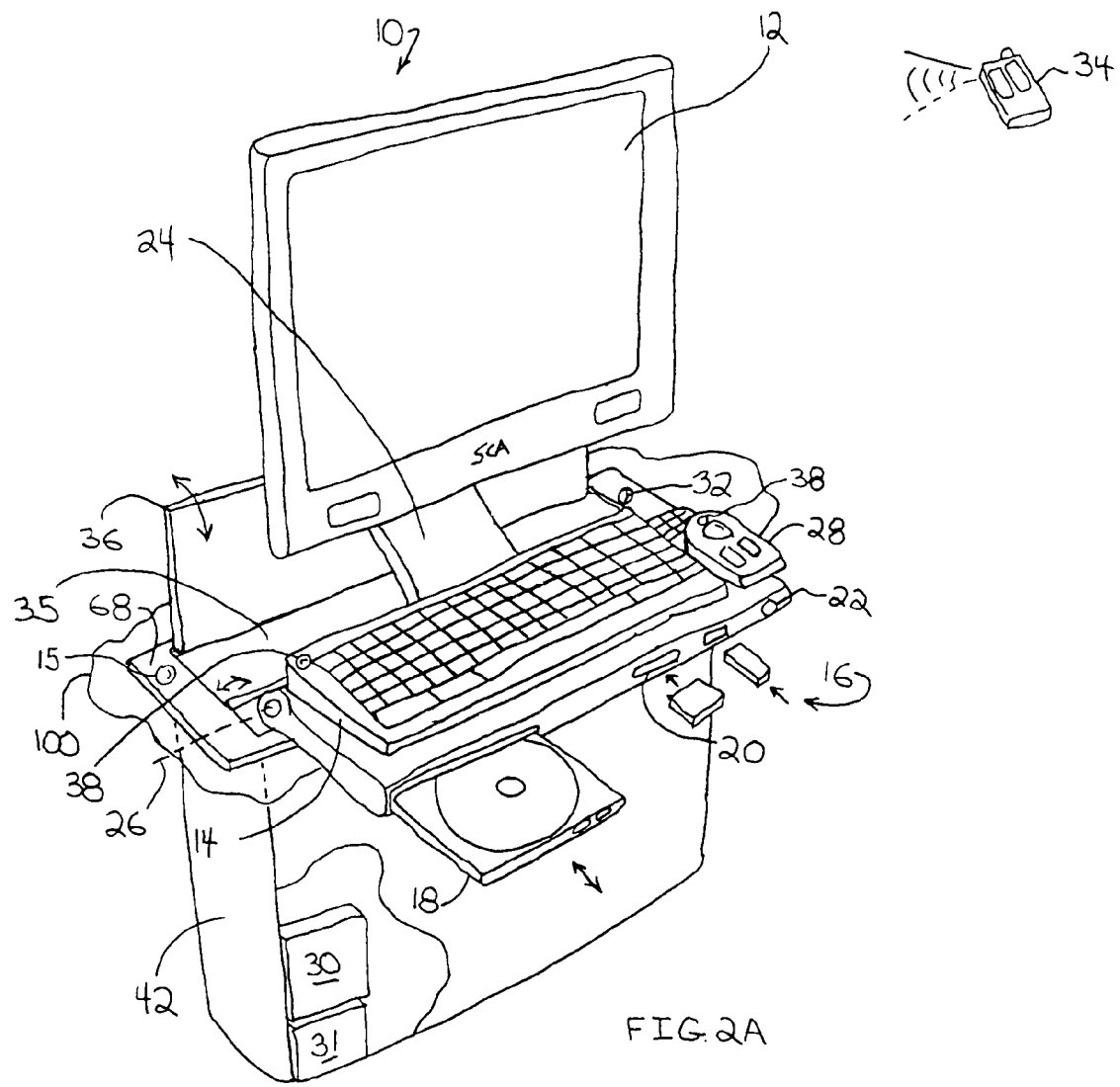
FIG. 2A is a perspective view of an alternative retractable computer arrangement pursuant to the invention disclosed herein.
Figure 2B:
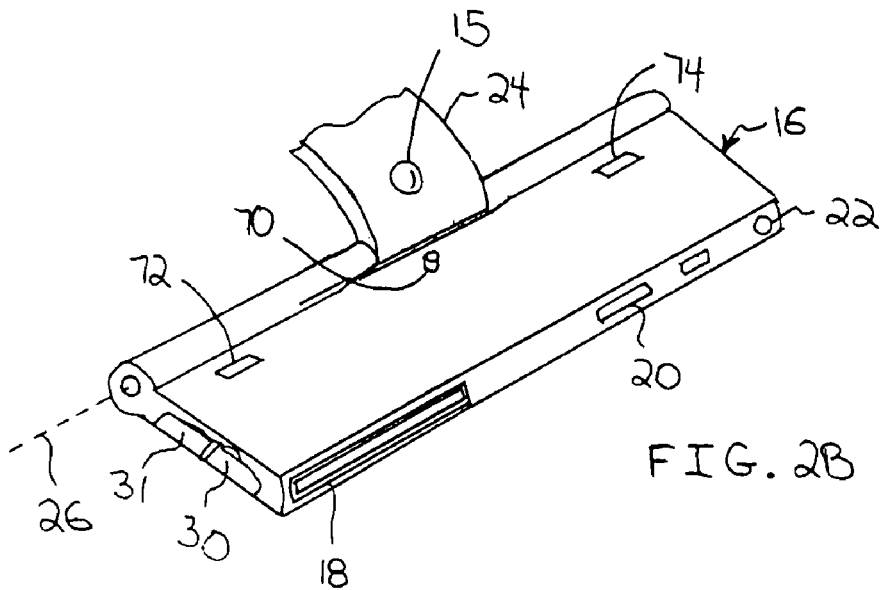
FIG. 2B is a perspective view of a keyboard support unit.
Figure 2C:
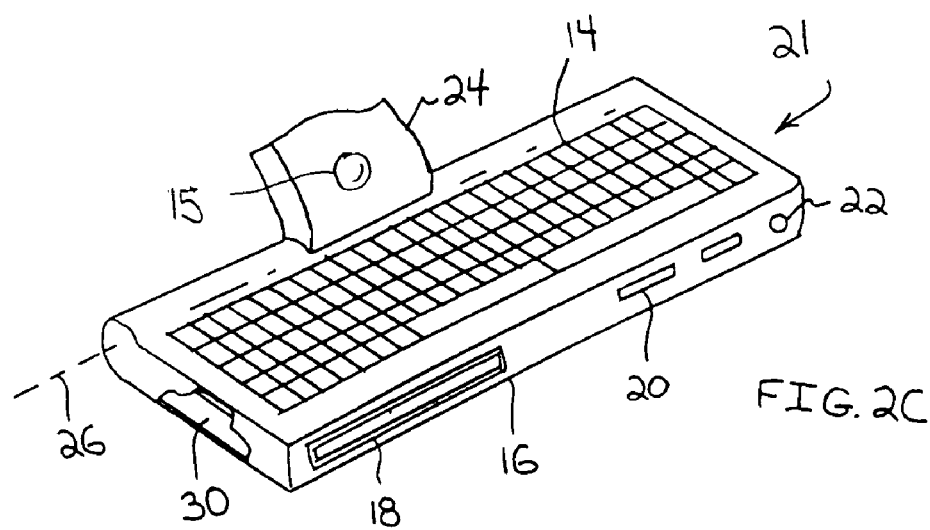
FIG. 2C is a perspective view of an integrated keyboard and support unit.

The keyboard 14 and the support unit 16 could be unified in an integrated unit 21 as exemplified in FIG. 2C, or they could be separable as, for example, in FIGS. 1 and 2A and 2B. In either case, the support unit 16 can incorporate one or more memory drives. For example, a first memory drive 18 can comprise a CD/DVD drive while second and further memory drives 20 can comprise floppy disk, memory stick, flash card, and any other type of memory drives. Still further, the support unit 16 can include one or more accessory ports 22 for connecting further computer peripherals.

As will be described further hereinbelow, where desirable and practicable, the support unit 16 could accomplish additional, or possibly all, central processing functions for the computer arrangement 10, such as by incorporating a central processing unit 30, a hard drive 31, and other components as in FIG. 2B. Alternatively or additionally, a hard drive 31 and central processing unit 30 can be electrically associated with the remainder of the computer arrangement 10, such as by being disposed within the enclosure 42 in FIG. 2A. In such embodiments, the computer arrangement 10 can comprise a functionally complete, autonomous computer system.

With further reference to FIG. 2B, the support unit 16 can provide power to the keyboard 14, possibly through a power interface 70 or by a wired connection. In certain embodiments, the power interface 70 can be employed to recharge the keyboard 14 to enable wireless operation. A data interface 72 can be provided on the support unit 16 for enabling data transfer, such as data backup and control and command functions, between the keyboard 14, the support unit 16, the monitor 12, the hard drive 31, and the central processing unit 30. An auxiliary interface 74 can enable further electronic and, additionally or alternatively, mechanical coupling between the keyboard 14 and the support unit 16.

In the embodiment of FIG. 2A, the computer arrangement 10 again can operate as a complete, extendable and retractable computer system. The computer arrangement 10 provides a monitor 12, keyboard 14, and support unit 16 that are extendable to the use configuration depicted and retractable to a storage configuration. The monitor 12 is again retained by a support arm 24. The support unit 16 incorporates memory drives 18 and 20 and accessory ports 22. The keyboard 14 and the support unit 16 can again pivot about a pivot axis 26.

The computer arrangement 10 can additionally incorporate a mouse 28, which can be wired or wireless. The mouse 28 can be removably retained by the support unit 16. As exemplified in FIGS. 2A through 2C, where desirable and technologically practicable, the support unit 16 or the keyboard 14 or the keyboard 14 and support unit 16 in combination could be crafted to carry out all central processing and other computer functions of the computer arrangement 10. Alternatively or additionally, the central processing unit 30 and other computer components could be otherwise operably associated with the monitor 12, the keyboard 14, any support unit 16 that is included, the mouse 28, and any other components. The central processing unit 30 could be fixed below the support surface 100. Alternatively, the central processing unit 30 and possibly other computer components could travel with the monitor 12 and other components of the computer arrangement 10. The keyboard 14 can have a wireless transmitter 38 as can the mouse 28.

Figure 2D:
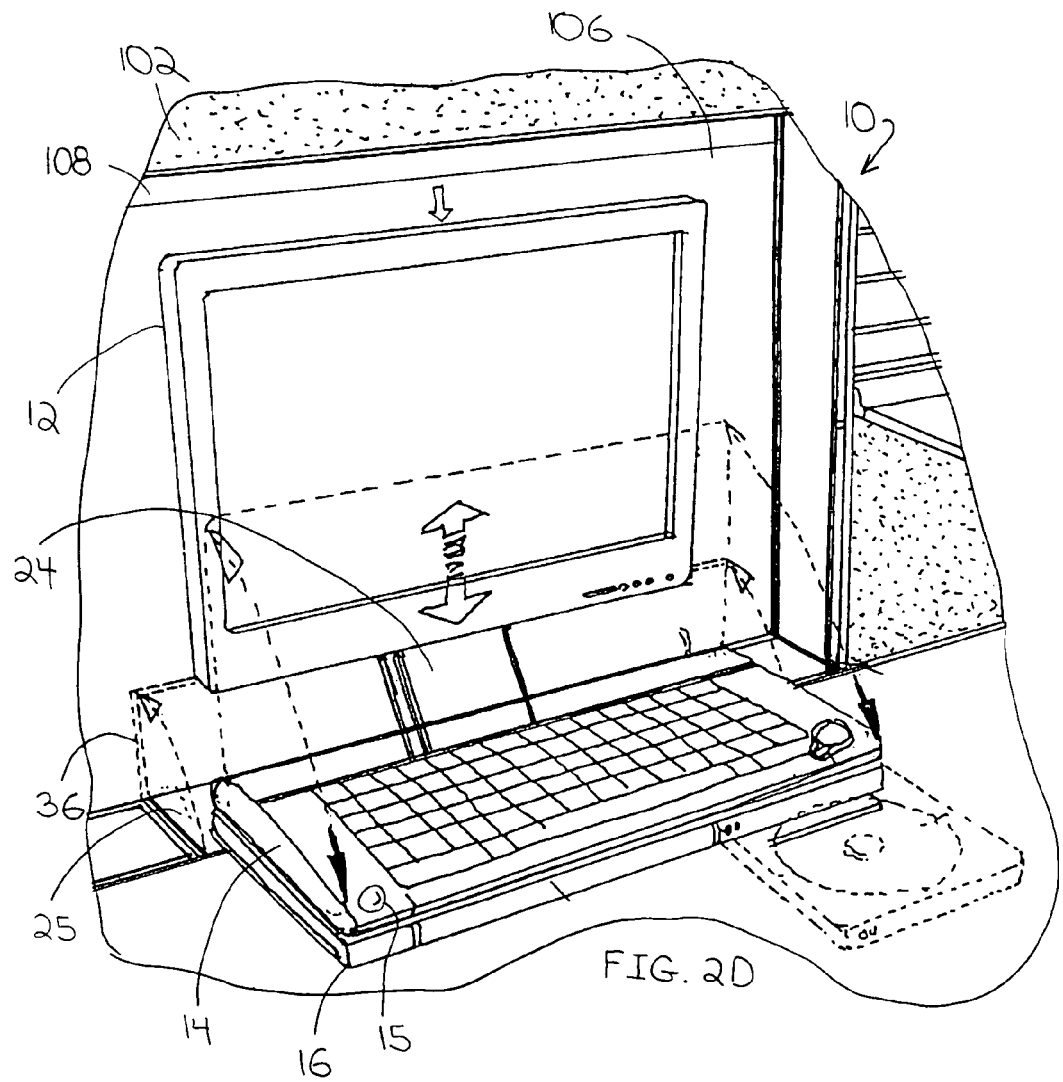
FIG. 2D is a perspective view of another retractable computer arrangement.
Figure 2E:
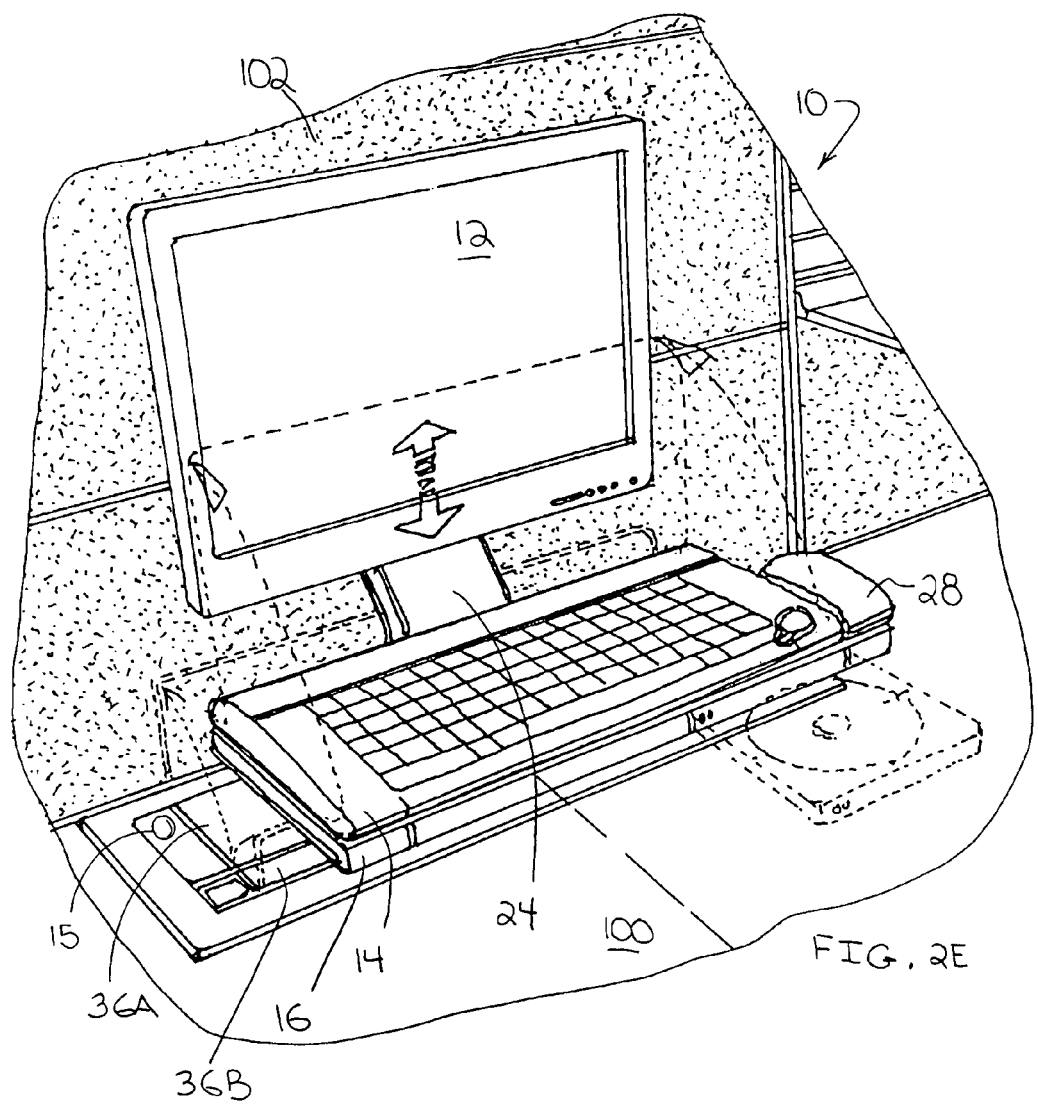
FIG. 2E is a perspective view of still another retractable computer arrangement.

As the embodiment of FIG. 2D illustrates, the computer arrangement 10 can be disposed to extend into an alcove 106 in a vertical support surface 102, such as a wall panel, to be used in relation to a horizontal support surface 100. In such an embodiment, the computer arrangement 10 can be essentially encased within a subsurface enclosure in the vertical support surface 102 when in a storage position. Alternatively, such as where the vertical support surface 102 extends only above the horizontal support surface 100, the computer arrangement 10 can be disposed below the horizontal support surface 100, ideally in a subsurface enclosure 42. When the computer arrangement 10 is in a retracted configuration, a sliding screen 108 can potentially be provided for closing off the alcove 106. The variation of the computer arrangement 10 of FIG. 2E additionally retains a mouse 28 in relation to the support unit 16. Furthermore, first and second aperture lids 36A and 36B can be selectively closed when the computer arrangement 10 is in a retracted configuration and while the computer arrangement is in a fully extended configuration.

Figure 2F:
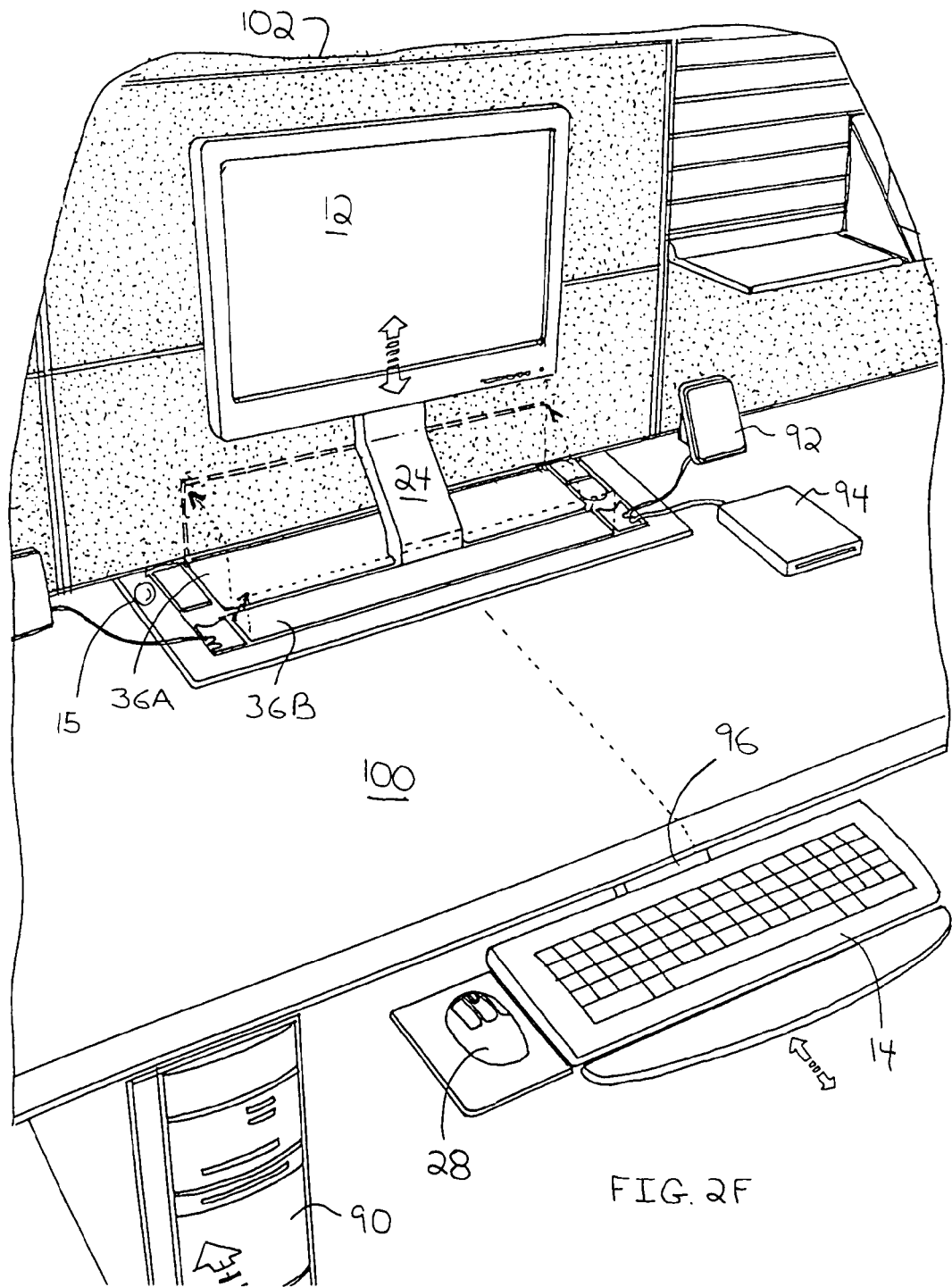
FIG. 2F is a perspective view of a further retractable computer arrangement.

Turning to FIG. 2F, a monitor 12 can again be extendably and retractably retained by a support arm 24. A tower computer component 90 can be disposed below the support surface 100 and can be operably coupled to the monitor 12, to speakers 92, to external drive units 94, and to a keyboard 14. The keyboard 14 can be retained separately relative to the monitor 12 by an extendable and retractable support arm 96. A mouse 28 can additionally be retained to extend and retract with the keyboard 14.

Figure 6:
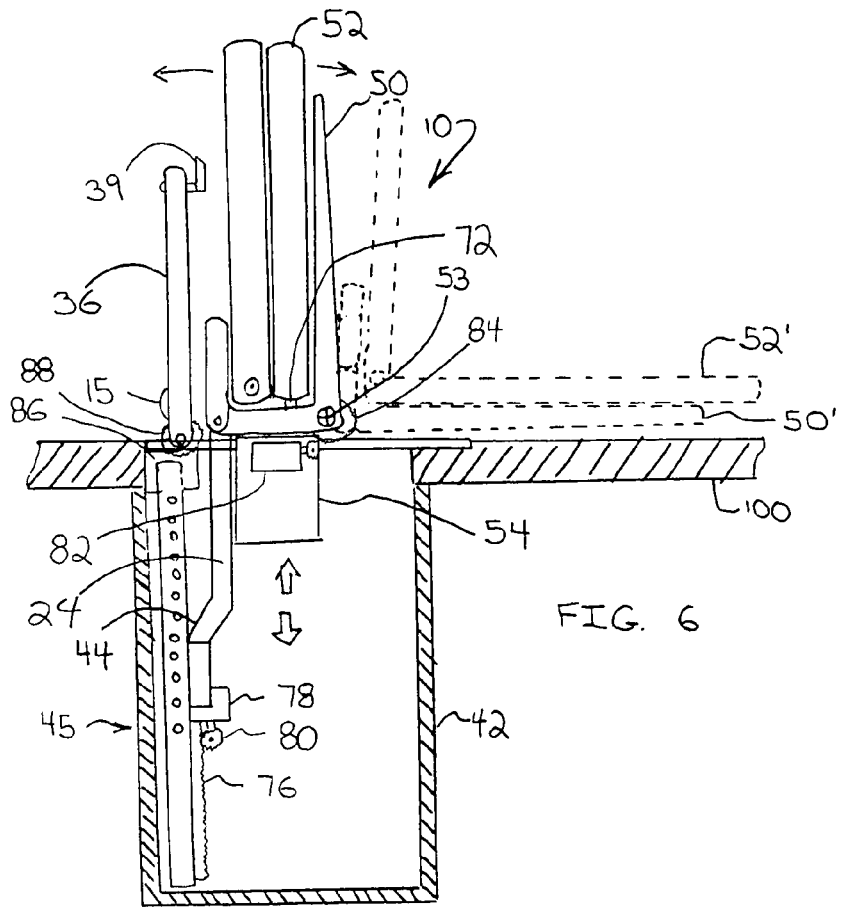
FIG. 6 is a sectioned view in side elevation of a further retractable computer arrangement.

When retracted, the monitor 12, the keyboard 14, and other components of the computer arrangement 10 can be retracted below the support surface 100, such as into a subsurface enclosure 42 as shown in FIGS. 4 through 6. The computer arrangement 10 can be mounted in relation to the support surface 100 by a flange 68 or other means. With reference to FIG. 2A, when the computer arrangement 10 is in a retracted configuration, the aperture 35 in the support surface 100, which in this example is essentially defined by the flange 68, can be sealed off by one or more aperture lids 36.

As noted, the computer arrangement 10 can be extended and retracted manually or by a motorized arrangement 45 as shown in FIG. 4. As shown in FIGS. 2A and 4, a remote control unit 34 can be employed to enable or induce the computer arrangement 10 to extend and retract. The remote control unit 34 can provide a command signal to the computer arrangement 10 by interaction with a wireless transmitter 32, which can be disposed, for example, on the flange 68.

Figure 3:
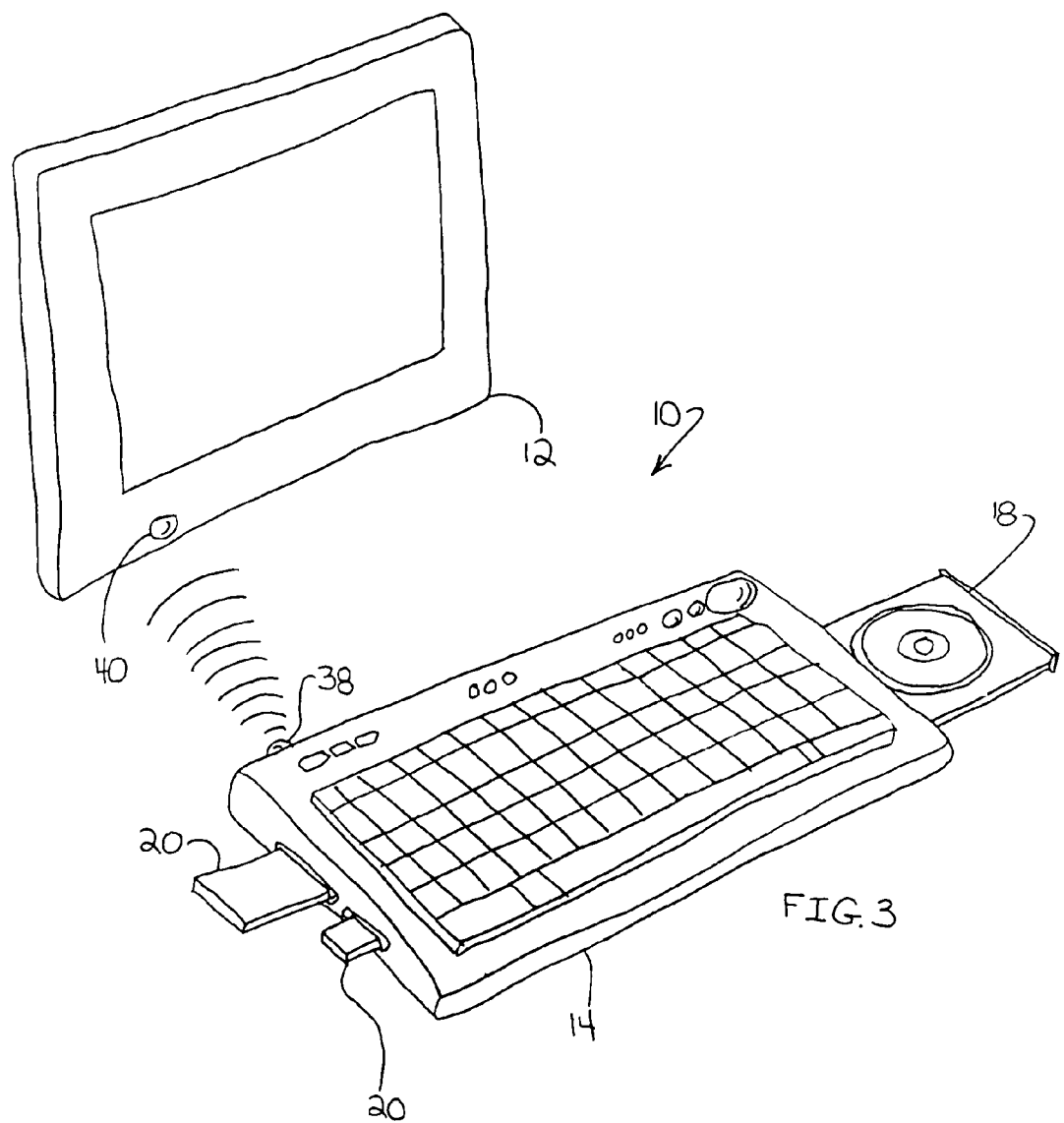
FIG. 3 is a perspective view of a computer keyboard and monitor arrangement according to the present invention.

As FIG. 3 shows, a wireless keyboard 14 can provide and receive command, control, display, and other signals in relation to the monitor 12 and the remainder of the computer arrangement 10 by the wireless transmitter 38 on the keyboard 14 in combination with a wireless transmitter 40 on the monitor 12, a wireless transmitter 32 on the flange 68, or a wireless transmitter elsewhere on the computer arrangement 10. In the embodiment of FIG. 3, the keyboard 14 directly incorporates a CD/DVD memory drive 18 and a plurality of floppy disk, flash card, PC card, and/or other memory drives 20. The keyboard 14 can further include a hard drive 31, a central processing unit 30, and other components thereby to enable an accomplishment of the central processing and other functions of the computer arrangement 10. Alternatively or additionally, a separate central processing unit 30, a hard drive 31, and other components can be provided and operably associated with the monitor 12 and keyboard 14 as in FIG. 2A.

Looking again to FIG. 4, it can be seen that the monitor 12, the keyboard 14, and the support unit 16 can be raised and lowered between extended and retracted positions by an extension and retraction arrangement 44, which again can be of any effective type. When retracted to a storage configuration, the monitor 12, the keyboard 14, and the other extendable and retractable components can be received into an enclosure 42, which can be fixed in place below the support surface 100.

The computer arrangement 10 can in certain embodiments exhibit an automatic retraction of all computer components or merely certain designated components. To facilitate such an automatic retraction, the extension and retraction arrangement 44 can enable a raising and lowering of the support arm 24 by operation of any effective means, such as a motorized arrangement 45. While innumerable motorized arrangements 45 are possible and within the scope of the invention, one possible motorized arrangement 45 is depicted in FIGS. 4 and 5 where an extension and retraction motor 78 drives a pinion gear 80 along a rack gear 76 to enable a motorized raising and lowering of the support arm 24.

Extension and retraction can be further enabled by a means for enabling an automatic pivoting of the keyboard 14 and support unit 16 or the integrated unit 21 to a storage configuration disposed adjacent to the monitor 12. By means that would be readily obvious to one skilled in the art, the integrated unit 21 or one or both of the support unit 16 and the keyboard 14 could be spring loaded to a storage configuration and selectively locked in a usage configuration by a selectively operable latching arrangement.

The latching arrangement could be released by a slight depression of the integrated unit 21 or the support unit 16 and the keyboard 14 and, additionally or alternatively, by an automatic releasing of the latching arrangement, or through activation of the remote control 34. Alternatively, as FIGS. 4 and 5 show, the integrated unit 21 or the support unit 16 and the keyboard 14 can be automatically pivoted between storage and usage configurations by a motor 82 and gearing arrangement 84.

With the monitor 12, the support arm 24, the keyboard 14 and support unit 16 retracted into the enclosure 42, the lid or lids 36 can be pivoted to a closed configuration by any effective means. For example, the lid 36 could be drawn closed by a mechanical interaction with the support arm 24 or the like. Alternatively, the lid 36 could be closed by gravity or by a spring loaded arrangement. Still further, as FIGS. 4 and 5 show, the lid 36 can be closed by a motor 86 that selectively drives a gearing arrangement 88.

Where a separate central processing unit 30 is provided, it can travel with the monitor 12 or be fixedly disposed within the enclosure 42. As in FIG. 4, the monitor 12 can be pivotable in relation to the distal end of the support arm 24 about a pivot axis 48. The keyboard 14 and support unit 16 can pivot about a pivot axis 26 to enable their selective disposition between a use configuration where they are indicated at 14 and 16 and a storage configuration where they are indicated at 14' and 16'. When the monitor 12 and other components are retracted, the aperture 25 can be closed by the aperture lid or lids 36 thereby further protecting the computer arrangement 10 and rendering the support surface 100 substantially continuous, unobstructed, and fully usable.

In each embodiment, the computer arrangement 10 can incorporate one or a plurality of sensors, such as the sensor indicated at 15 in the drawings, to sense a condition that warrants retraction of the monitor 12 or other computer component. As the various drawings make clear, the sensor or sensors 15 can be disposed in any effective location, including, by way of example, on the monitor 12, one the support arm 24, on the flange 68, on the keyboard 14, on the lid 36, on a support surface 100, or elsewhere. The computer arrangement 10 can additionally or alternatively sense a condition warranting retraction by interconnection with a building security system, fire alarm system, or other emergency or security sensing system. The sensor 15 and/or any remote sensing arrangement can sense the movement of an intruder, the triggering of sprinkler systems, excessive temperature conditions indicative of fire, tampering, unauthorized access, and/or any other emergency or retraction condition. Of course, various types of sensors can be employed for sensing plural different conditions. Additionally or alternatively, all computer arrangements 10 in a building or a given portion of a building can be induced to retract in response to a sensed condition.

When an emergency or security condition is sensed, the computer arrangement 10 can induce an automatic retraction of all computer components or merely certain designated components. To facilitate such an automatic retraction, the extension and retraction arrangement 44 can enable a raising and lowering of the support arm 24 by operation of any effective means, such as a motorized arrangement 45. While innumerable motorized arrangements 45 are possible and within the scope of the invention, one possible motorized arrangement 45 is depicted in FIG. 4 and elsewhere in the form of an extension and retraction motor 78 that drives a pinion gear 80 along a rack gear 76 to enable a motorized raising and lowering of the support arm 24. Extension and retraction can be further enabled by a means for enabling an automatic pivoting of the keyboard 14 and support unit 16 or the integrated unit 21 to a storage configuration disposed adjacent to the monitor 12. By means that would be readily obvious to one skilled in the art, the integrated unit 21 or one or both of the support unit 16 and the keyboard 14 could be spring loaded to a storage configuration and selectively locked in a usage configuration by a selectively operable latching arrangement.

The latching arrangement could be released by a slight depression of the integrated unit 21 or the support unit 16 and the keyboard 14 and, additionally or alternatively, by an automatic releasing of the latching arrangement in response to a sensed emergency condition or through activation of the remote control 34. Alternatively, as FIG. 4 and others show, the integrated unit 21 or the support unit 16 and the keyboard 14 can be automatically pivoted between storage and usage configurations by a motor 82 and gearing arrangement 84.

With the monitor 12, the support arm 24, the keyboard 14 and support unit 16 retracted into the enclosure 42, the lid or lids 36 can be pivoted to a closed configuration by any effective means. For example, the lid 36 could be drawn closed by a mechanical interaction with the support arm 24 or the like. Alternatively, the lid 36 could be closed by gravity or by a spring loaded arrangement. Still further, as FIG. 4 shows, the lid 36 can be closed by a motor 86 that selectively drives a gearing arrangement 88. Of course, additional or otherwise disposed motorized arrangements could be employed as necessary, particularly where pivoting support arms 24 and 46 are employed.

In each embodiment disclosed herein, the enclosure 42 can be a rigid enclosure to provide protection and security to the computer arrangement 10 against environmental conditions, intruders, and inadvertent contact when the computer arrangement 10 is in a retracted configuration. The enclosure 42 and the lid 36 or lids 36A and 36B can incorporate fire resistant and retardant material and can be fire rated to protect the computer arrangement in the event of fire conditions. Furthermore, the enclosure 42, the lid 36 or lids 36A and 36B, and possibly gasket material or similar means can cooperate to define an effectively watertight arrangement to prevent damage during sprinkler activation, intentional tampering, and other circumstances. Still further, the lid 36 or lids 36A and 36B can incorporate one or more locking arrangements 39 to further the ability of the computer arrangement 10 to withstand tampering, theft, and other security threats. Under such a system, the computer arrangement 10 can automatically be rendered substantially impervious to theft, tampering, and damage during emergency and security threats by a retraction of exposed computer components and a sealing of the lid 36.

As FIG. 5 shows, the proximal end of the support arm 24 can pivot about a pivot axis 27, and the monitor 12 can again pivot about a pivot axis 48 at the distal end of the support arm 24. The pivoting at the pivot axes 27 and 48 can be independent or proportional, such as by a parallel movement arrangement. The monitor 12 and the support arm can thus be adjusted between positions, such as where the monitor and the support arm are indicated at 12 and 24 respectively and where they are indicated at 12' and 24' respectively.

As FIG. 5 also depicts, the keyboard 14 and the support unit 16 can be retained at a distal end of a support arm 46 to pivot about pivot axis 26, and the proximal end of the support arm 46 can pivot about a pivot axis 29 to allow the relative position and orientation of the keyboard 14 to be adjusted. The keyboard 14, which could be wired or wireless, could be removable and replaceable in relation to the support unit 16. With this, the keyboard 14 and support unit 16 can be disposed in a use configuration where they are indicated at 14 and 16 and a storage configuration where they are indicated at 14' and 16'. Further, the keyboard 14 can be removed from the support unit 16 to enable use in the detached disposition where the keyboard is indicated at 14".

Turning to FIGS. 6, 6A, 6B, 6C, 6D, and 7, one sees that the computer arrangement 10 could employ a cradle 50 to support a laptop computer 52. The laptop 52 could be fixedly retained or removable relative to the cradle 50 to enable a disposition in a storage configuration where the laptop is indicated at 52 and a detached configuration where the laptop is indicated at 52'. The cradle 50 and the retained laptop 52 can extend and retract by use of any effective extension and retraction arrangement 44. When retracted, the cradle 50 and the retained laptop 52 can be received into an enclosure 42.

Figure 6B:
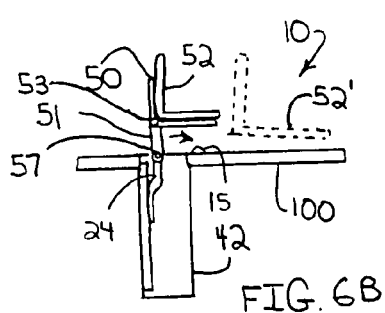
FIG. 6B is a sectioned view in side elevation of another variation of the retractable computer arrangement of FIG. 6.

The cradle 50 can incorporate or allow an operable coupling to a docking unit 54. The docking unit 54 can include support accessories and functions for the laptop 52 including power and power recharging sources, drivers, memory and memory backup backup, and further capabilities. As FIG. 6C shows, the cradle 50 can incorporate a power interface 70 for enabling a recharging of the laptop 52. Additionally, a data interface 72 can enable data transfer, such as data backup and control and command functions, between the laptop 52, the cradle 50 and a hard drive, and central processing unit, and other components of the docking unit 54. Still further, one or more auxiliary interfaces 74 can enable further electronic and, additionally or alternatively, mechanical couplings between the laptop 52 and the cradle 50.

The laptop 52, and possibly the cradle 50, can be pivotable about a pivot axis 53 to enable the laptop 52 and the cradle 50 to be adjusted between an orientation aligned with the extension and retraction arrangement 44 to enable a retraction into the enclosure 42 and a use orientation, such as adjacent to the support surface 100 or detached, where the cradle and the laptop are indicated at 50' and 52' respectively. When the laptop 52 and the cradle 50 are retracted into the enclosure 42, the aperture lid 36 or lids 36A and 36B can close off the aperture 25 thereby to cooperate with the enclosure 42 to provide security and protection from environmental effects, inadvertent contact, theft, tampering, and other potential adverse effects.

Figure 6A:
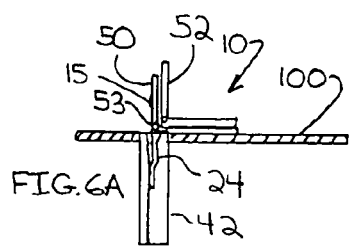
FIG. 6A is a sectioned view in side elevation of a variation of the retractable computer arrangement of FIG. 6.
Figure 6C:
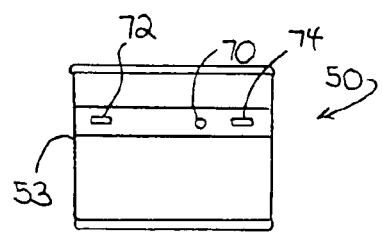
FIG. 6C is a top plan view of a monitor cradle in an open configuration.
Figure 6D:
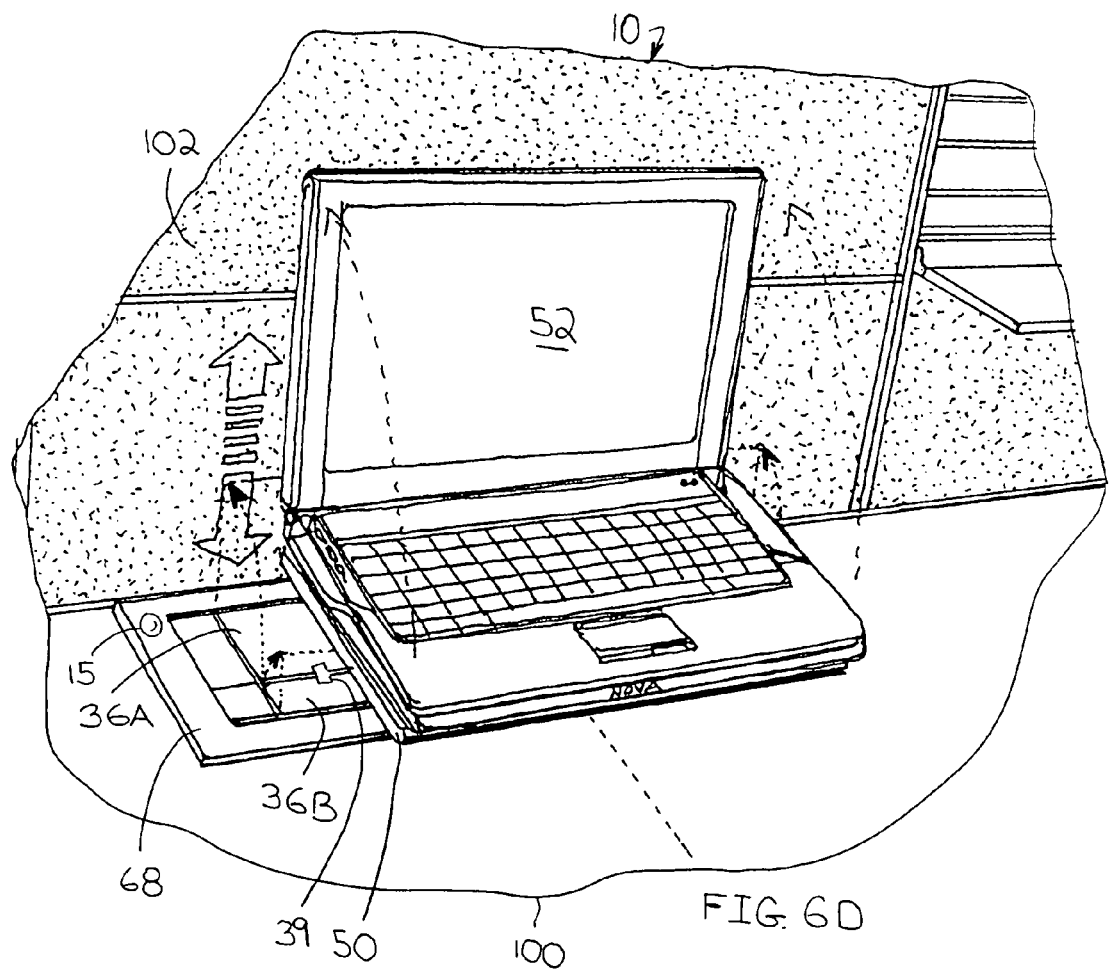
FIG. 6D is a perspective view of a further computer arrangement.
Figure 7:
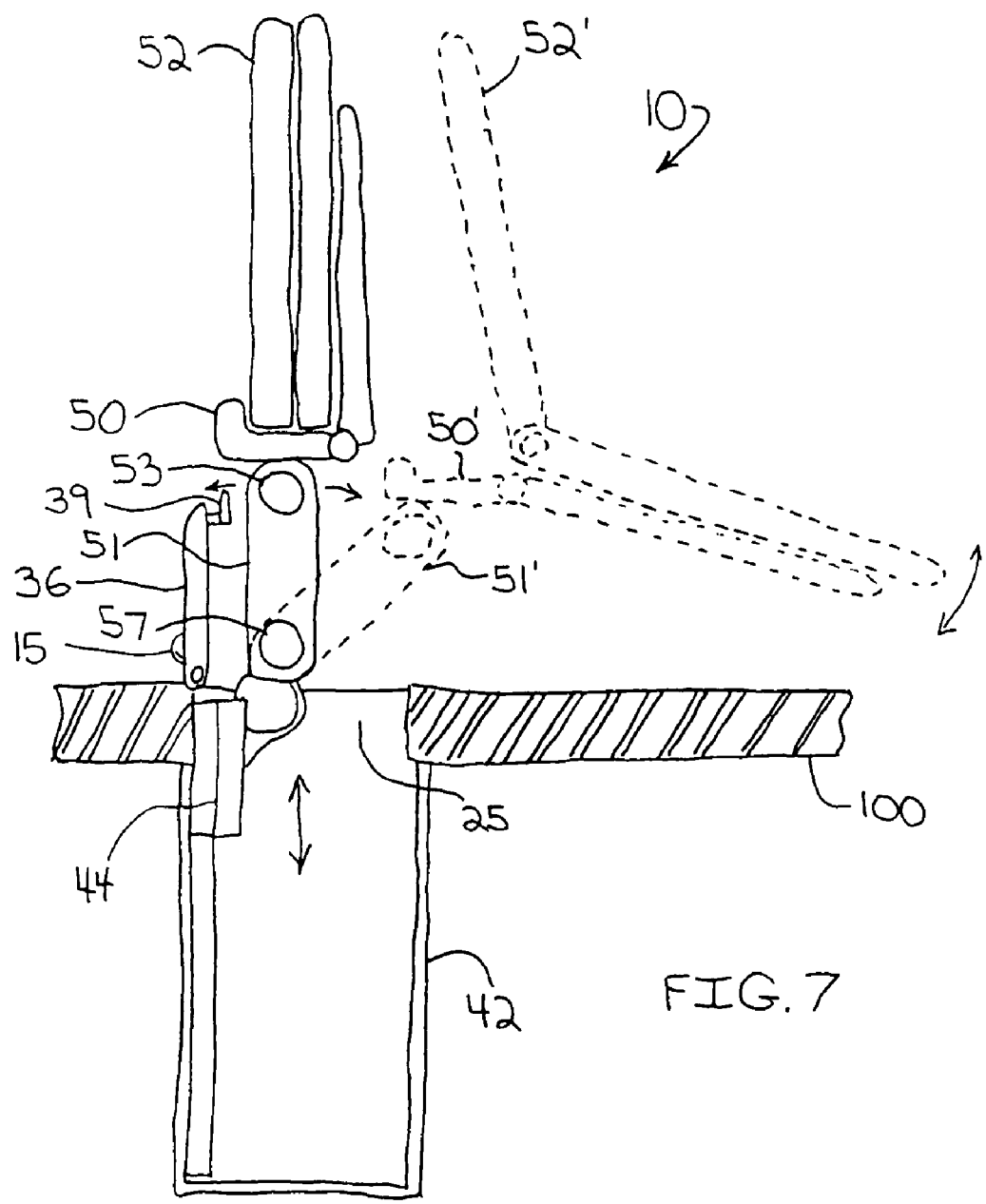
FIG. 7 is a sectioned view in side elevation of an alternative retractable computer arrangement.

The laptop 52 and the cradle 50 could be coupled directly to the extension and retraction arrangement 44 as is depicted in FIGS. 6 and 6A. Alternatively, as is shown in FIGS. 6B and 7, the laptop 52 and/or the cradle 50 could be retained relative to a support arm 51. The laptop computer 52 and/or the cradle 50 could pivot about a pivot axis 53 at a distal end of the support arm 51, and the support arm 51 could pivot about a pivot axis 57 in relation to the extension and retraction arrangement 44. With this, the orientation and relative location of the laptop 52 and the cradle 50 can be adjusted, such as to the use configuration where the laptop and the cradle are indicated at 52' and 50 respectively. Where the laptop 52 and the cradle 50 are retained by a support arm 51, therefore, the laptop 52 can, for example, be maintained at a shelf height in relation to the support surface 100, immediately adjacent to the support surface, or anywhere in between. The support arm 51 can be spring balanced, possibly to remain in equipoise. Furthermore, the support arm 51 can demonstrate parallel movement to retain the laptop 52 in a desired orientation.

In a manner similar to previous embodiments, the support arm 24, and thus the cradle 50 and laptop 52 or other article, can be extended and retracted by any effective means, such as by a motorized arrangement 45 with a motor 78, a pinion gear 80, and a rack gear 76. Also, the lid 36 or lids 36A and 36B can be automatically operable by any suitable means, such as by operation of a motor 86 and gear arrangement 88. Still further, if necessary or desirable, the cradle 50 and any retained article can be pivoted between storage and usage positions by a motor 82 and gear arrangement 84.

The computer arrangement 10 can incorporate an alarm arrangement, which can be triggered when tampering, attempted theft, emergency conditions, or other alarm conditions are sensed. The alarm arrangement can be operable in a first mode when the laptop computer 52 and the cradle 50 are extended and in a second mode when the laptop computer 52 and the cradle 50 are retracted into the enclosure 42.

Figure 6E:
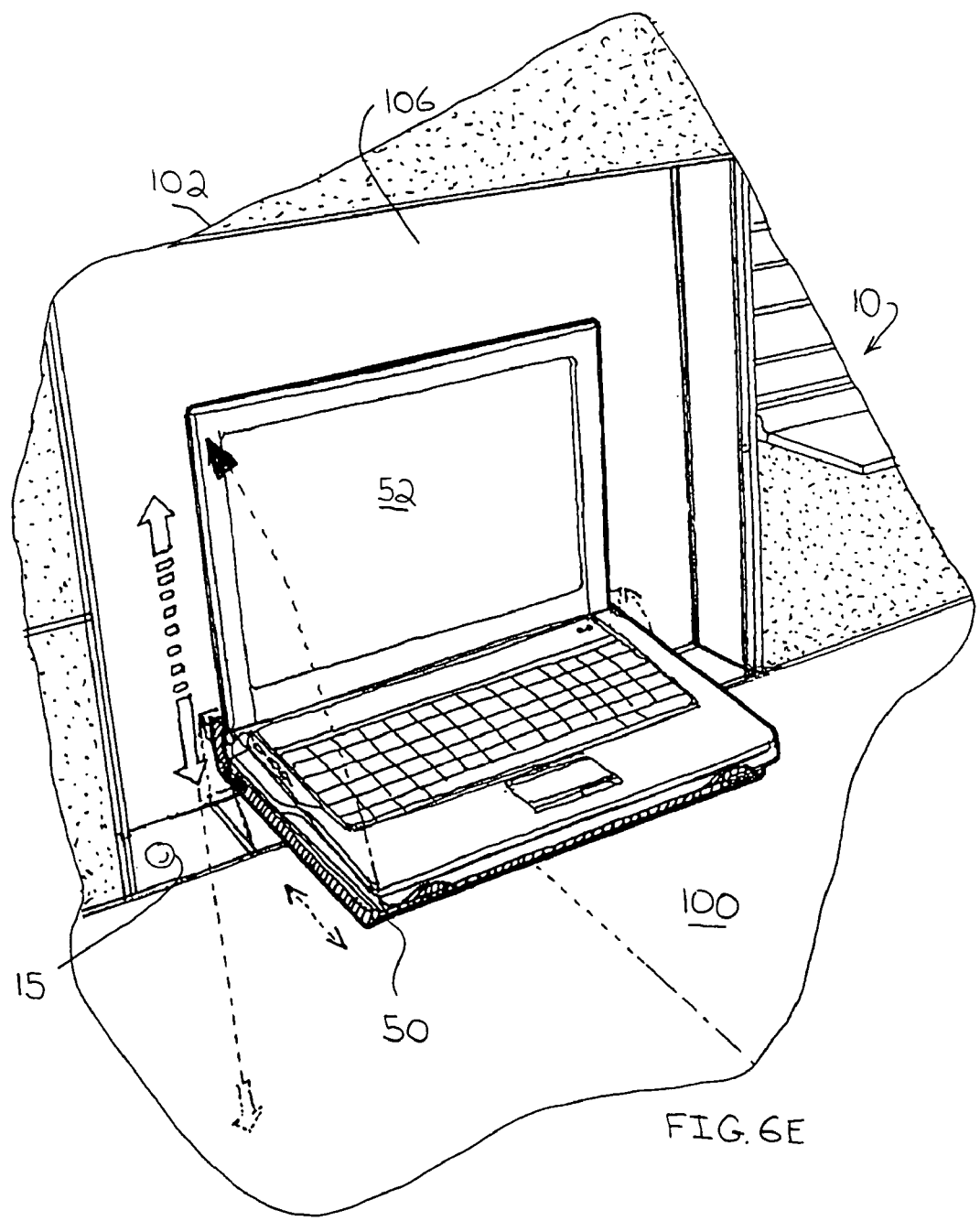
FIG. 6E is a perspective view of another computer arrangement.

As shown in FIG. 6E, the computer arrangement 10 for retaining a laptop 52 could be essentially self-contained within a support surface 102 in a manner similar to the embodiment of FIG. 2D. The cradle 50 and thus the laptop 52 could be extendable and retractable. Again, the computer arrangement 10 could be disposed within an alcove 106 in the support surface 102. In the present embodiment, as with the embodiment of FIG. 2D, the computer arrangement 10 is entirely retained relative to the support surface 102, which again can comprise a wall panel. The wall panel 102 thus becomes the carrier for the computer arrangement. As such, all other support surfaces, such as the support surface 100, are not relied upon. This frees the support surface 100 and frees designers and users to configure computer spaces in arrangements that would otherwise be prevented by the need for supporting computer components. For example, a cantilevered or similarly fixed support surface 100 could be foregone in favor of a moveable support surface, a physically separate support surface, a differently configured support surface, or a support surface retained at an otherwise impractical height.

Figure 8:
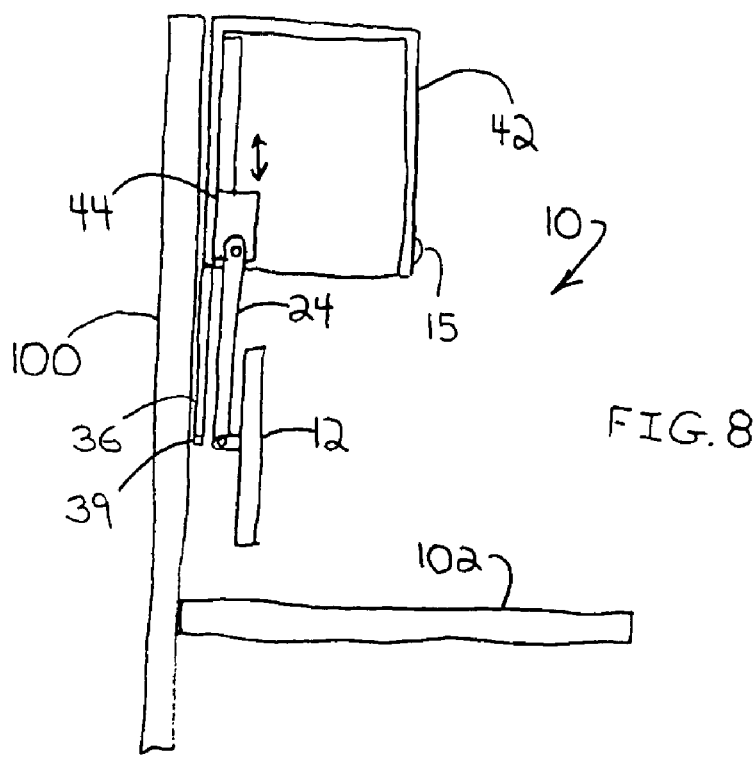
FIG. 8 is a sectioned view in side elevation of an additional retractable computer arrangement as disclosed herein.

In the embodiment of the computer arrangement 10 of FIG. 8, the extension and retraction arrangement 44 can enable a monitor 12, a laptop computer (not shown in FIG. 8), or any other computer or computer component to extend and retract in relation to a cabinet or other enclosure 42 disposed above a second support surface 102, which could, for example, comprise a desk, a counter, or any other support surface 102. The computer arrangement 10 could be supported by support surface 100, which could comprise a wall panel or any other support surface 100.

Figure 9:
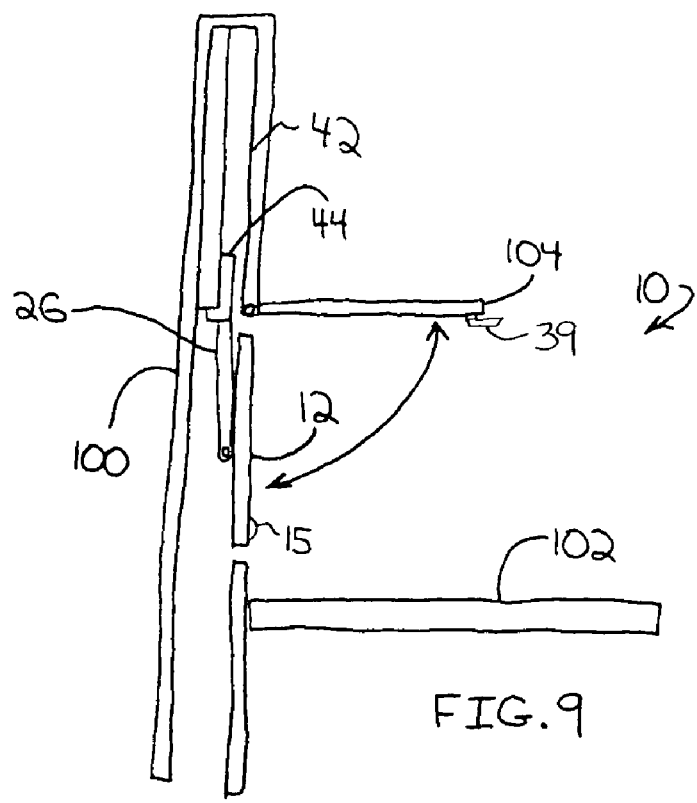
FIG. 9 is a sectioned view in side elevation of another alternative retractable computer arrangement.

Another variation of the computer arrangement 10 is depicted in FIG. 9. There, the extension and retraction arrangement 44 is slidable within an open inner volume of a vertically disposed support surface 100, which again could comprise a wall panel or any other support surface 100. A monitor 12, a laptop computer (not shown in FIG. 9), or any other computer or computer component can be coupled to extend and retract by use of the extension and retraction arrangement 44. In FIG. 9, the monitor 12 is pivotally retained by the extension and retraction arrangement 44 to pivot about a pivot axis 26 whereby the relative orientation of the monitor 12 can be adjusted. A pivotably retained panel 104 can be coupled to the support surface 100 to enable an effective sealing off of the enclosure 42. The support surface 100 can additionally retain or merely be associated with a secondary support surface 102, which can comprise a desk, a counter, or the like, and further support surfaces 104, which can, for example, comprise shelves.

Figure 10:
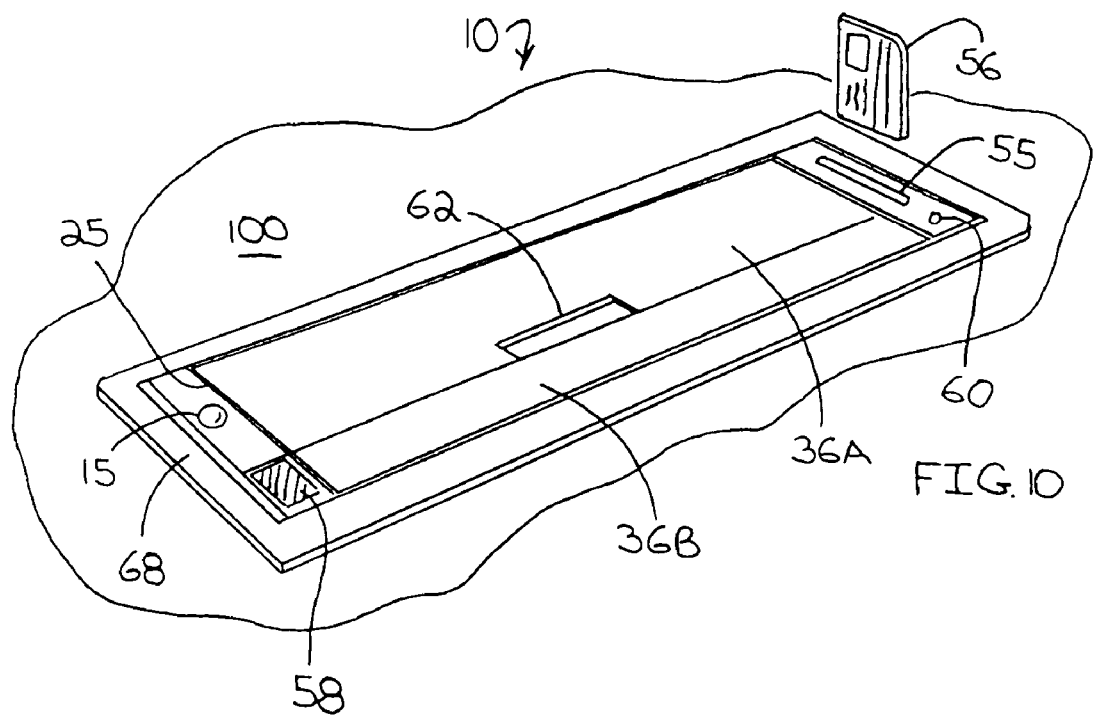
FIG. 10 is a perspective view of an access arrangement for use in relation to a retractable computer arrangement.

In FIG. 10, an embodiment of the computer arrangement 10 is depicted in a retracted configuration. The computer arrangement 10 provides first and second aperture lids 36A and 36B that cooperate to close off the aperture 25. The first aperture lid 36A can have an arm aperture 62 for accommodating the support arm 24. Thus, when the monitor 12 has been raised sufficiently to allow the aperture lids 36A and 36B to clear the monitor 12, the first and second aperture lids 36A and 36B can be pivoted to a closed position while the computer arrangement 10 is extended.

The aperture 25 can thus be effectively sealed off to prevent objects from falling into the enclosure 42, to prevent damage to and tampering with the computer arrangement 10, and to be neater aesthetically. By providing first and second aperture lids 36A and 36B, the monitor 12 and support arm 24 can be raised to a lesser height than would be the case with a single aperture lid while allowing the lids 36A and 36B to be closed than would be required with just a single aperture lid 36. It will be noted that other aperture lid arrangements are possible including, for example, plural hingedly connected panels, a flexible, slidable panel, and numerous other constructions that are each within the scope of the present invention.

The computer arrangement 10 can limit access by one or more security or access devices. As is shown in FIG. 10, for example, a coded access card 56 or key (not shown in FIG. 10) can be inserted into an access card port 55 or keyhole, which can read the access card 56 or accept the key to provide selective access to the computer arrangement 10. In one manifestation of the invention, the access card 56 could comprise an employee identification badge or the like. Alternatively, the access card 56 could be a purchased card that could provide access based, for example, on purchase from a supplier. Of course, other types of access cards 56 and access control means are contemplated and within the scope of the invention. For example, a further device for controlling access to the computer arrangement 10 could come in the form of a fingerprint recognition arrangement 58. In certain cases, multiple security or access devices, such as the fingerprint recognition arrangement 58 and the access card 56, can be required in combination to enable access to the computer arrangement 10.

Figure 11:
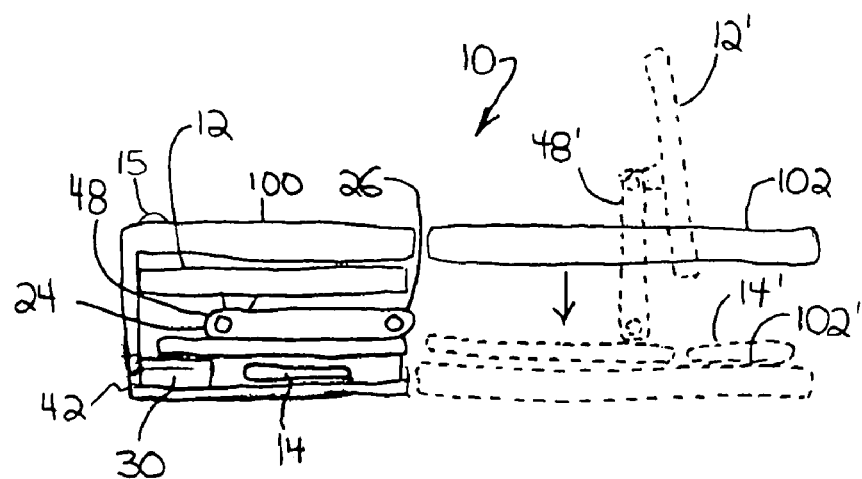
FIG. 11 is a sectioned view in side elevation of a divided surface retractable computer arrangement.

Still other adjustable computer arrangements 10 are possible within the scope of the invention. For example, as is shown in FIG. 11, the computer or computer component, in this case the monitor 12, can be horizontally extendable and retractable in relation to a first support surface 100 and possibly a second support surface 102 by an extension and retraction arrangement 44. In one example, the first and second support surfaces 100 and 102 can comprise portions of a bifurcated desk. The second support surface 102 can be movable, such as by being pushed downward, to a stowed configuration wherein the computer arrangement 10 is disposed above the second support surface 102.

The monitor 12 can be retained by a support arm 24 whereby it can be pivoted about proximal and distal pivot axes 26 and 48 to a desired position and orientation. An enclosure 42 can house a central processing unit 30 and other computer components, which can be disposed below the support surface 100. The enclosure 42 can also removably retain a keyboard 14, a mouse 28, and other computer components. The second support surface 102, the monitor 12, the keyboard 14, and the support arm 24 can thus be adjusted to the between the storage configuration shown and the use configuration where the second support surface, the monitor, the keyboard, and the support arm are indicated at 102', 12', 14', and 24' respectively.

Figure 12:
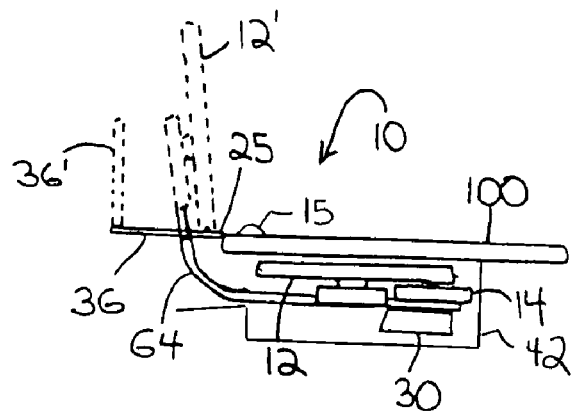
FIG. 12 is a sectioned view in side elevation of a still further retractable computer arrangement.

In the embodiment of FIG. 12, the computer or computer component, in this case a monitor 12 with a pivotally coupled keyboard 14 with an integral or separate central processing unit 30 and related components, is adjustable from a retracted configuration below a support surface 100 to an extended configuration exposed in relation to the support surface 100. The extension and retraction is performed as the monitor 12 and other components are slid in an arcuate path. In the illustrated embodiment, the monitor 12 is substantially parallel to and below the support surface 100 when in a retracted condition and transverse and above the support surface 100 when in an extended condition. In this essentially schematic example, an arcuate pathway 64 can be provided by any appropriate mechanism including, for example, one or more arcuate channels or guide bars. The monitor 12 and other components could be passed beyond an edge of the support surface 100 or through an aperture 25 in the support surface 100. Where an aperture 25 is provided, it can be sealed off by one or more aperture lids 36.

Figure 13A:
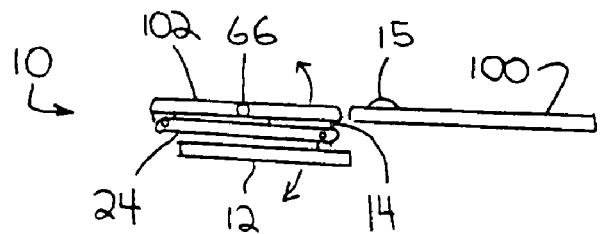
FIG. 13A is a sectioned view in side elevation of an even further retractable computer arrangement in a storage configuration.
Figure 13B:
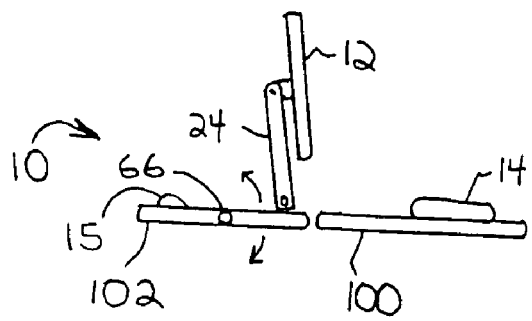
FIG. 13B is a sectioned view in side elevation of the retractable computer arrangement of FIG. 13A in a use configuration.

In the embodiment of FIGS. 13A and 13B, bifurcated first and second support surfaces 100 and 102 can again be provided. The computer arrangement 10, which can include a monitor 12, keyboard 14, a laptop computer 52, and/or any other type of computer component and the second support surface 102 can be mutually pivotable about a pivot axis 66. With this, the computer arrangement 10 can be disposed in a retracted configuration wherein the second support surface 102 is disposed above the computer arrangement 10 and the first and second support surfaces 100 and 102 define an essentially continuous surface. The computer arrangement 10 can alternatively be disposed in a second, extended configuration by a pivoting of the second support surface 102 about the pivot axis 66 effectively to dispose the monitor 12 above the second support surface 102 and ready for use. A pivotable support arm 24 can enable an adjustment of the location and orientation of the monitor 12 or other computer component.

Figure 14:
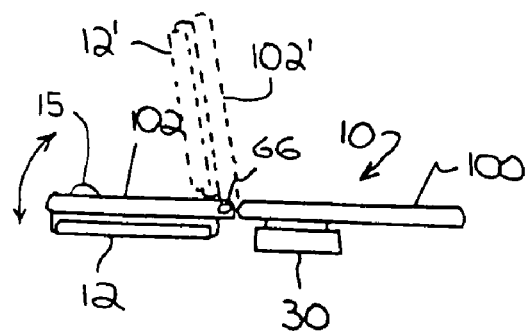
FIG. 14 is a sectioned view in side elevation of yet another retractable computer arrangement.

The computer arrangement 10 of FIG. 14 can again be retained relative to first and second support surfaces 100 and 102. The computer arrangement 10, which can include a monitor 12, can be retained relative to the second support surface 102, and the second support surface 102 can be pivotable about a pivot axis 66 adjacent to the first support surface 100. The second support surface 102 can be clear or it can have an aperture therein such that the monitor can be disposed as indicated at 12' to be viewed when the second support surface is pivoted upwardly in relation to the first support surface 100 to the position indicated at 102'.

Figure 15:
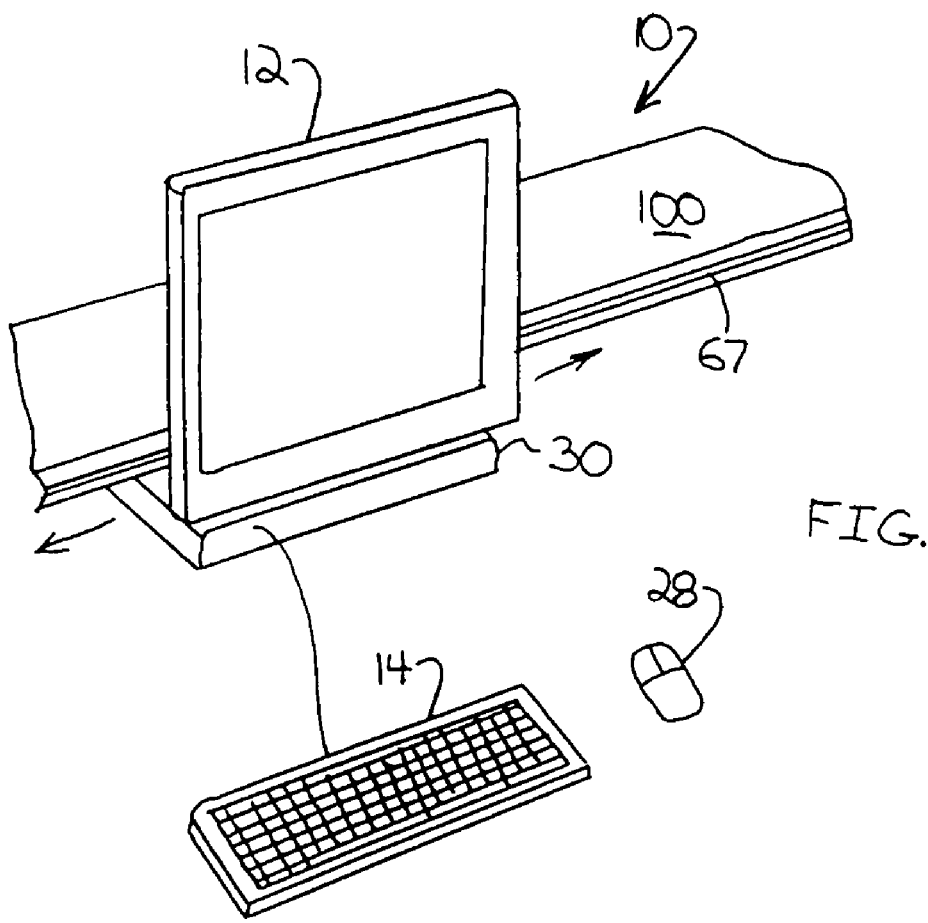
FIG. 15 is a perspective view of a laterally adjustable computer configuration pursuant to the present invention.

Turning finally to FIG. 15, a computer arrangement 10 can be retained for lateral adjustment by having a monitor 12 and possibly a central processing unit 30 and other computer components retained for lateral sliding in relation to what can be termed a lateral slide track 67. The lateral slide track 67 can stand independently. Alternatively, the lateral slide track 67 can be coupled to or be part of a support surface 100. A keyboard 14 and a mouse 28, which can each be wired or wireless, can be operably associated with the monitor 12 and central processing unit 30.

With certain embodiments of the present invention for emergency and security condition retractable computer arrangements disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft arrangements that incorporate certain inventive aspects of the disclosed invention while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof whether now known or hereafter developed or discovered.

I claim as deserving the protection of Letters Patent:

1. A computer arrangement for inducing a retraction of a computer component in response to a sensed emergency or security condition, the computer arrangement comprising:
    an enclosure with an open inner volume;
    a support member extendably and retractably retained relative to the enclosure;
    means for retaining the computer component in relation to the support member;
    means for selectively inducing a retraction of the support member at least partially into the open inner volume of the enclosure;
    means for sensing the emergency or security condition; and
    means for automatically inducing a retraction of the support member in response to the sensed emergency or security condition;
    whereby the computer component is retracted at least partially into the enclosure in response to the sensed emergency or security condition.

2. The computer arrangement of claim 1 wherein the means for retaining the computer component comprises a means for retaining a computer monitor.

3. The computer arrangement of claim 1 wherein the means for retaining the computer component comprises a means for retaining a computer keyboard.

4. The computer arrangement of claim 3 wherein the means for retaining the computer keyboard comprises a support unit for retaining the computer keyboard.

5. The computer arrangement of claim 4 wherein the means for retaining the computer component further comprises a means for retaining a computer monitor in relation to the support member wherein the means for retaining the computer monitor and the means for retaining the computer keyboard comprise a cradle for removably and replaceably retaining a laptop computer for extension and retraction with the support member.

6. The computer arrangement of claim 4 wherein the support unit is pivotable between a first, storage disposition and a second disposition.

7. The computer arrangement of claim 6 further comprising a means for enabling an automated pivoting of the support unit to the first, storage disposition in response to the sensed emergency or security condition.

8. The computer arrangement of claim 1 further comprising at least one lid for selectively closing off the open inner volume of the enclosure when the support member is in a retracted disposition.

9. The computer arrangement of claim 8 further comprising a means for enabling an automated closing of the lid in response to the sensed emergency or security condition thereby to close off the open inner volume of the enclosure.

10. The computer arrangement of claim 9 further comprising a locking arrangement for selectively locking the at least one lid against opening.

11. The computer arrangement of claim 8 wherein the enclosure includes fire resistant and retardant material for protecting the open inner volume and the computer component from fire damage.

12. The computer arrangement of claim 8 further comprising means for rendering the open inner volume of the enclosure substantially watertight when the lid is in a closed position.

13. The computer arrangement of claim 1 wherein the means for sensing the emergency or security condition comprises a sensor disposed on the computer arrangement.

14. The computer arrangement of claim 13 wherein the sensor comprises a sensor chosen from the group consisting of a motion sensor, a smoke sensor, and an access sensor.

15. The computer arrangement of claim 1 wherein the means for sensing the emergency or security condition comprises a means for receiving emergency or security condition information from an external source.

16. The computer arrangement of claim 1 further comprising a means for controlling access to the computer component comprising a means for selectively preventing and enabling extension of the support member.

17. The computer arrangement of claim 16 wherein the means for selectively preventing and enabling extension of the support member comprises an access control mechanism in combination with a means for enabling an extension of the support member based on the access control mechanism.

18. The computer arrangement of claim 17 wherein the means for selectively preventing and enabling extension of the support member further comprises a lid.

19. The computer arrangement of claim 17 wherein the access control mechanism is chosen from the group consisting of an access card, an access key, and a fingerprint identification means.

20. A computer arrangement for inducing a retraction of a computer component in response to a sensed emergency or security condition, the computer arrangement comprising:
    an enclosure with an open inner volume;
    a support member extendably and retractably retained relative to the enclosure;
    means for retaining a computer monitor relative to the support member;
    means for retaining a computer keyboard relative to the support member;
    means for selectively inducing a retraction of the support member at least partially into the open inner volume of the enclosure;
    means for sensing the emergency or security condition; and
    means for automatically inducing a retraction of the support member in response to the sensed emergency or security condition;
    whereby the computer monitor and the computer keyboard is retracted at least partially into the enclosure in response to the sensed emergency or security condition.

21. The computer arrangement of claim 20 wherein the means for retaining the computer keyboard comprises a support unit wherein the support unit is pivotable between a first, storage disposition and a second disposition and further comprising a means for enabling an automated pivoting of the support unit to the first, storage disposition in response to the sensed emergency or security condition.

22. The computer arrangement of claim 20 wherein the means for retaining the computer monitor and the means for retaining the computer keyboard comprise a cradle for removably and replaceably retaining a laptop computer for extension and retraction with the support member.

23. The computer arrangement of claim 20 further comprising at least one lid for selectively closing off the open inner volume of the enclosure when the support member is in a retracted disposition and further comprising a means for enabling an automated closing of the lid in response to the sensed emergency or security condition thereby to close off the open inner volume of the enclosure.

24. The computer arrangement of claim 20 wherein the means for sensing the emergency or security condition comprises a sensor disposed on the computer arrangement.

25. The computer arrangement of claim 20 wherein the means for sensing the emergency or security condition comprises a means for receiving emergency or security condition information from an external source.

26. The computer arrangement of claim 20 further comprising a means for controlling access to the computer component comprising a means for selectively preventing and enabling extension of the support member.

* * * * *